(12) United States Patent
Olsson

(10) Patent No.: US 7,194,384 B2
(45) Date of Patent: Mar. 20, 2007

(54) METHOD FOR ESTIMATING DAMAGE TO AN OBJECT, AND METHOD AND SYSTEM FOR CONTROLLING THE USE OF THE OBJECT

(75) Inventor: Karl Erik Olsson, Lonsboda (SE)

(73) Assignee: Volvo Articulated Haulers AG, Växjö (SE)

( * ) Notice: Subject to any disclaimer, the term of this patent is extended or adjusted under 35 U.S.C. 154(b) by 325 days.

(21) Appl. No.: 10/710,592

(22) Filed: Jul. 22, 2004

(65) Prior Publication Data

US 2004/0260512 A1 Dec. 23, 2004

Related U.S. Application Data

(63) Continuation of application No. 10/248,459, filed on Jan. 21, 2003, now abandoned, which is a continuation of application No. PCT/SE01/01624, filed on Jul. 16, 2001, now abandoned.

(30) Foreign Application Priority Data

Jul. 20, 2000 (SE) .................................... 0002723

(51) Int. Cl.
*G06F 19/00* (2006.01)

(52) U.S. Cl. ........................................ 702/185; 706/45
(58) Field of Classification Search ........ 702/182–185, 702/33–36, 58, 59, 188; 700/9, 21, 110; 706/45

See application file for complete search history.

(56) References Cited

U.S. PATENT DOCUMENTS 5,210,704 A * 5/1993 Husseiny ...................... 702/34
5,817,958 A * 10/1998 Uchida et al. ............. 73/865.9

\* cited by examiner

*Primary Examiner*—Edward Raymond
(74) *Attorney, Agent, or Firm*—Novak Druce & Quigg, LLP

(57) ABSTRACT

Method and apparatus for estimating damage to an object, with at least a first parameter which corresponds to an operational state for the object and at least a second parameter which corresponds to a condition during the operational state being determined by at least one operation measurement, and with such measurement being carried out repeatedly. A total load that is defined by the total influence of the first and second parameters on the life of the object is then calculated. The invention also relates to a method and a system for controlling the use of the object.

35 Claims, 2 Drawing Sheets

METHOD FOR ESTIMATING DAMAGE TO AN OBJECT, AND METHOD AND SYSTEM FOR CONTROLLING THE USE OF THE OBJECT

CROSS REFERENCE TO RELATED APPLICATIONS

The present application is a continuation patent application of U.S. application Ser. No. 10/248,459 filed 21 Jan. 2003, now abandoned which is a continuation patent application of International Application No. PCT/SE01/01624 filed 16 Jul. 2001 which was published in English pursuant to Article 21(2) of the Patent Cooperation Treaty, and which claims priority to Swedish Application No. 0002723-5, filed 20 Jul. 2000. All such applications are expressly incorporated herein by reference in their entireties.

TECHNICAL FIELD

The present invention relates to a method for estimating life reducing damage to an object which is subjected to a load during operation. The method considers at least a first parameter that corresponds to an operational state that generates such damage to the object and at least a second parameter that corresponds to a condition for, or around an object that, by itself, is not able to generate the damage but which makes the damage generated by the operational state worse. The determination is made by at least one operation that is measurement, and such measurement is carried out repeatedly. The invention also relates to a system and method for controlling the use of the object.

The invention can, for example, be applied in a means for transport, such as a vehicle, a vessel or another means of transport, such as means for transport on rails. The word vehicle relates to various ground vehicles, such as vehicles with wheels or tracks. The invention is, in particular, suitable to be applied to a construction machine such as a wheel loader, an excavator or an articulated hauler also known as a dumper. The area of application of the invention is, however, not limited to these applications; it can also be applied in stationary devices.

Below, the invention is exemplified utilizing a rotating means in the gear box of a vehicle as the object of interest. The invention in this case relates to the calculation of surface fatigue of the teeth and the bearings, respectively. This should be seen as a preferred, but in no way a limiting application of the invention.

Exemplarily, the first parameter that corresponds to an operational state for the object relates to a parameter that on its own can generate damage to the object. By the word "damage", weakening of the object is intended, or in other words a reduction of the useable life of the object. An example of such an operational state is a torque transferred to the object during a number of revolutions. Other examples of such an operational state are various types of forces which come to bear on the object.

The second parameter that corresponds to a condition occurring at the operational state relates to a parameter that on its own would not cause any damage to the object. It is only in combination with the first parameter that corresponds to an operational state for the object that it can make the damage to the object worse. Examples of such conditions are the environment around the object, for example the amount of particles, such as metal filaments produced and present in lubricating oil.

BACKGROUND ART

The effect on the life of a gear wheel by an applied torque during a number of revolutions can be calculated by conventional means. It is also appreciated that specific parameters corresponding to operational conditions for the gear wheel with applied torque will affect its susceptibility to damage. That is, this condition has an effect on the damage caused by the applied torque during revolutional operation of the gear wheel. An example of such an operational condition is the temperature of oil used to cool the gear wheel during operation. Known models for such calculations, however, lack precision.

DISCLOSURE OF INVENTION

A primary purpose of the invention is to provide a method for predicting the influence of a plurality of parameters on the life of an object that gives higher precision than known methods when calculating the remaining life of the object after a certain amount of use has occurred. A secondary purpose of the invention is to obtain a method that generates values on load and/or damage that in a storage-efficient manner can be stored in a memory with limited memory capacity.

These purposes are obtained by a total load which is defined by the total effect on the life of the object by the operational state and the operational condition is calculated in such a way that variations in the damage resistance of the object which the operational condition gives rise to are adjusted for, and the total load is expressed as a product of a function for the operational state and a function for the operational condition. The total load is thus a measure of a simulative influence of both the operational state and the current operational condition(s), which creates the conditions for high precision, since there in reality is an interaction between the operational state and the operational condition.

These other parameters, for example temperature, particle load and water content of the cooling medium can have large influences on the damage that a specific load causes to the object. A calculation of the remaining life based on both (1) the load that is defined by the first parameter and (2) the condition that is defined by the second parameter permits high precision predictive calculations. In more detail, the invention takes into consideration the variations in the susceptibility to damage of the object which is caused by the other parameters.

In so doing, conditions are also created for storing a result of the calculation based on the first parameter that corresponds to a load, and a plurality of other parameters which affect the susceptibility to damage of the object in a position (cell) in a memory unit. This leads to a reduced need for memory.

According to a preferred embodiment of the invention, the total load is calculated multiple (a plurality of) times during the period over which the measurements are taken. This results in a further reduction in memory requirement since a reduced number of measured values need be stored. This also causes a higher precision in estimating the damage. Preferably, the calculation of total load is carried out continuously during the time that the measurements are taken.

According to another preferred embodiment of the invention, the total load is calculated after each determination of the first parameter. Such a determination can in practice be a measurement of the first parameter. Only one value, the calculated value for the total load, is then saved for each increment in time. This creates the conditions for an even more efficient memory unit concerning memory space.

According to another preferred embodiment of the invention, the calculated values are summed for the total load, and the result is stored in a first field in a memory unit. This creates the conditions for a continuous or on-line control of the influence of both the operational states and the operational conditions. This feature is not limited to storing only the result, but at least the result of the summation is stored.

According to a further development of the previous embodiment of the invention, the second parameter is assumed to be constant during a plurality of measurements of the first parameter in a further calculation of the total load, and the total load is calculated with the second parameter at the constant value, the calculated values are summed, and the result is stored in a second field in the memory unit. In this embodiment, the second parameter is suitably set to a value that has been measured in real tests. For example, this embodiment can be used as the basis for future dimensioning of the object/a device comprising (including, but not necessarily limited to) the object. The embodiment is used in cases with small variations in the operational conditions.

According to another preferred embodiment of the invention, the number of load cycles are measured for the first parameter, and in a matrix in a memory unit which matrix comprises a plurality of different positions which each corresponds to a specific operational state and at least one specific condition, the number of load cycles are added in the respective positions. Suitably, a matrix is used which has a number of predefined levels of the operational state on a first axis and a number of predetermined levels for the operational conditions on a second axis. The matrix can be expanded for further operational states to an n-dimensional matrix. If a first parameter and two second parameters are measured, a three-dimensional matrix is used.

By means of this embodiment, the measured values can be stored in a memory unit, for example in a vehicle which comprises the object and can then at a later point in time be transmitted or transferred to a unit for calculating the total load. This embodiment permits a fewer calculations to be necessitated at the vehicle.

According to another preferred embodiment of the invention, at least one of the first and the second parameters are described as an exponential function. This creates conditions for a simple, and regarding memory capacity, efficient way to express the total load with high precision. In addition, conditions are created for using the Palmgren-Miner partial damage theory.

According to another preferred embodiment of the invention, a total life influencing damage in the object is calculated after a certain amount of time as the sum of each of the calculated total loads before this point in time. This life influencing damage can be used in a number of various ways. For example, information regarding the remaining damage can be presented directly to the driver of the vehicle so that he is aware of the status of the object. This can lead to a milder operation of the vehicle/object. He can furthermore decide on continued operation of the vehicle, exchanging or repairing the object and the like. The information is suitably presented on a display to the driver. According to one alternative, an electrical device such as a computer is connected to the vehicle for presentation to service personnel, the system's owner(s) or other interested parties.

According to another example, this information is transmitted to a base station or a central terminal. This makes it possible to control the status of a plurality of vehicles and to plan their continued operation. When renting the vehicle, charges can be calculated based on damage or reduced life caused by the renter's use.

According to another preferred embodiment of the invention, the first parameter is measured at a higher frequency than the second parameter. In other words, the first parameter is measured at shorter intervals in time than the second parameter. A measured value for the second parameter is in this case used for calculating the total load for several measured values of the first parameters that follow each other in time. In this way, the number of necessary measurements is reduced. This is particularly preferred in cases when the second parameter, at least in periods, varies within a relatively small interval.

A further purpose of the invention is to obtain a system for communication between a base station and at least one remotely located stationary or mobily arranged machine, via transmitting and receiving means for controlling the operational status of the machine. Exemplarily, the machine comprises an object which is susceptible to damage, and the system creates conditions (institutes certain actions or controls) for controlling the operational status of the object at a position remote from the object. In particular, a system for predicting malfunctions or breakdowns of the object and taking measures before such malfunctions occur is afforded by implementation of the invention.

Exemplarily, this purpose is obtained by a system comprising a control unit, means for measuring a plurality of operational parameters of the object, and means for calculating damage done to the object based on the measured operational parameters.

Further preferred embodiments and advantages of the invention will become evident from the following description.

BRIEF DESCRIPTION OF THE DRAWINGS

The invention will be described in greater detail below, with reference to the embodiment(s) shown in the appended drawings, in which.

MODE FOR THE INVENTION

The word "damage" refers in the following to a weakening of an object, or in other words, a reduction in remaining useful life. The term "operational state" refers to a load which, by itself, can inflict damage or reduce the remaining life to the object. In other words, a strength (also known as damage resistance) of the object is reduced when it is exposed to a load. The strength is at each point in time dependent both on the internal structure or make-up of the object, such as, for example, its material of construction and/or the operational conditions or environment in which the object performs or operates. Thus, operational conditions, on their own, do not cause damage (at least of the type which is presently of interest or being measured) to the object.

The object is exemplified in a first embodiment of the method by a component in the powertrain of the vehicle. In particular, surface fatigue of the teeth on a gear wheel in a gear box is intended. The operational state (in the following called the first parameter) is the torque that the gear wheel transfers during a number of revolutions.

The strength of the object depends on the supporting ability of the flanks of the gear teeth. The strength can be influenced by several operational conditions (in the following called the second parameter), and include such things as: (1) temperature, which can reduce the viscosity of the oil and thus the supporting ability of the oil film; (2) particulate load (especially those particles larger than the lubricating thickness); and (3) water content in the oil.

Below, a method used for making calculations in a first embodiment of the invention, and the theory therebehind, is described with reference to the appended drawings. In this embodiment the first and the second parameters are measured repeatedly.

The object that is exposed to the loads has, according to the description above, a so-called varying (variable) strength. First a method is described that deals with so-called constant strength. The term "constant strength" of the object means that the damage susceptibility of the object is not influenced by the environment or the conditions that it is in. Therefore, an explanation is provided of a varying strength of an object occurring with respect to a preferred embodiment of the invention's application.

Figure 1:
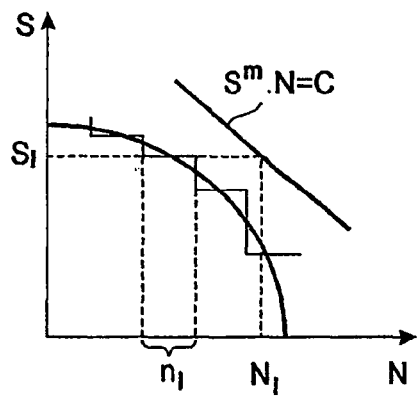
FIGS. 1–4 show four graphs, each of which illustrate load strength functions as indicated thereon.

In the instance of constant strength, many life functions can be described as exponential functions. The Wöhler curve, also called the SN curve, is a well known example of fatigue in the case of a load having constant amplitude (See FIG. 1 in which logarithmic scales are exemplified). An exemplary relationship is defined by $S^m*N=C$ {Equation 1} in which S=signal level, for example tension, torque; N=the number of cycles to fracture; and C=a constant for a certain curve.

The constant C can be considered a measurement of the object's tolerance for damage; that is, the amount of damage that can endured (absorb) before a fracture occurs. This is, in other words, a measurement of strength.

Real loads are often applied with variable amplitude and are referred to as spectrum load(s). This can be described by means of the Palmgren-Minor partial damage hypotheses (See FIG. 1) in which the partial damage value=$\Sigma(ni/Ni)=p$ {Equation 2} and wherein Ni=the number of cycles to fracture at the signal level SI; ni=the number of load cycles in the spectrum at the same level Si; p=partial damage value=1 in the case of fracture, but which is often valued at 0.7, or another suitable value.

The summation is done over the entire spectrum. The fatigue limit is ignored since it is a phenomenon that occurs in the case of load with constant amplitude. In the following manner, {Equation 1} is introduced into {Equation 2}: $p=\Sigma(Si^m*ni/C)=(1/C)*\Sigma(Si^m*ni)$ {Equation 3}. In this case, the strength, C, is constant. The notion of load, D, is defined by {Equation 4} in which $D=\Sigma(Si^m*ni)$. From Equations 2 and 3, it becomes evident that p=D/C. The ratio D/C thus indicates how large a portion of the damage tolerance which has been consumed by the load D.

As described above, the strength varies in many cases. The strength can, to be more exact, vary without decreasing successively. An example of this is surface fatigue in the case of cogs and bearings. Logging the damage in the form of load only, for example torque and number of revolutions, without adjusting for the variation in strength, will for this reason give a relatively poor precision.

It is therefore desirable to create a method that also takes into account the variation in strength.

In the instance of varying strength, there is an interaction between load and strength. For example, a certain torque level will cause more damage at a high temperature (which brings about lower viscosity) of the cooling oil than in the case of low temperature. It is not feasible to record torque and temperature separately in order to then adjust for the temperature. For this reason, this is carried out according to the invention in each small time interval; i.e., continuously, or "on-line".

According to {Equation 1}, the relationship between load, signal level (for example, torque, M, or number of revolutions N) and fracture can be described according to {Equation 5} in which $Mi^m*Ni=Ci$.

Figure 2:
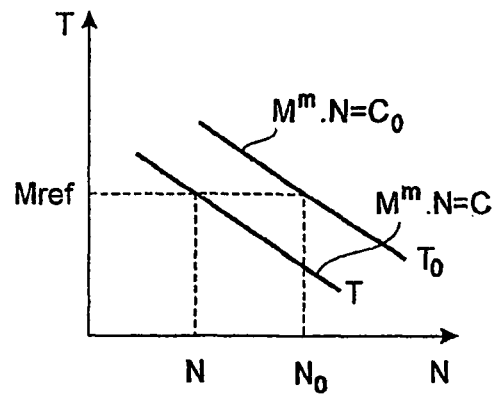

The decisive difference in the case of varying strength is that the tolerance for damage Ci is not constant, but depends on such things as temperature, particle load, water content and the like. For example, different temperatures will produce different values of the strength, Ci (See FIG. 2).

Figure 3:
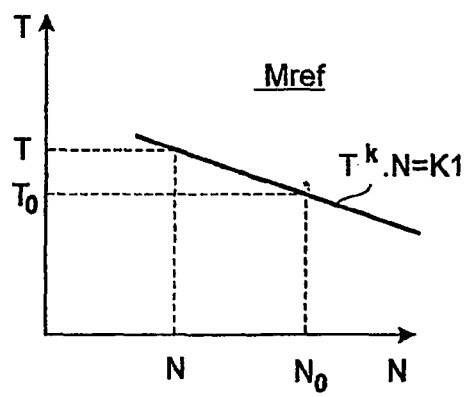

FIG. 3 corresponds to tests run at the same load level at different temperatures. It turns out that the fatigue function can be described by {Equation 6} in which: $Ti^k*Ni=K1$. In {Equation 6}, T is the temperature, N is the amount of cycles to fracture, and k and K1 are constants.

Figure 4:
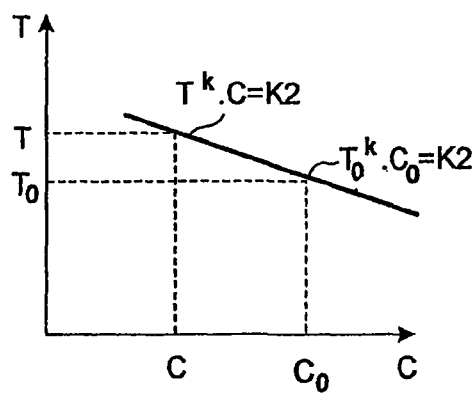

Tests have been carried out at the same load level, which means that the strength, C, is in proportion to the life N, and thus, according to the illustration of FIG. 4, results in {Equation 7} in which $Ti^k*Ci=K2$. Therefrom, the relationship $Ci=K2/Ti^k$ is obtained, and by substitution into {Equation 3}, a partial damage value p is obtained thereby producing {Equation 8} in which: $p=\Sigma(Si^m*ni*Ti^k/K2)$.

A reference temperature To, preferably the one at which the test is carried out, is chosen. The strength equation is then C=Co. Thus, {Equation 9} produces $K2=To^k*Co$.

The introduction of {Equation 9} into {Equation 8} yields $p=1/Co)*\Sigma(Si^m*ni*(Ti/To)^k)$ {Equation 10}.

With Co a constant, $Dkorr=\Sigma(Si^m*ni*(Ti/To))$ {Equation 11} which is thus a load value which is adjusted for variations in strength to a reference value. Between {Equations 10 and 11}, p=Dkorr/Co, wherein the ratio Dkorr/Co gives a good indication of the damage portion which has been consumed.

Increasing to more varying strength parameters is trivial. If the particle ratio is p, the water amount v, and q and r are exponent and reference values, respectively, then reference values are obtained according to: $Dkoor=\Sigma(Si^m*ni*(Ti/To)^k*(pi/po)^q*(vi/vo)^r)$ {Equation 12}.

In this embodiment, the strength function has been described as an exponential function. By so doing, simple expressions are obtained for load and strength. It is, however, within the scope of the appended claims to describe the strength function in another way.

It has additionally been assumed that the influence of the load and the strength parameter on the life can each be described by means of one or several exponential functions, which can generally be done with acceptable precision.

Preferably, the D value is summed successively. This means that the result can be placed in only one cell, irrespective of how many parameters are taken into consideration. The memory need will thus be relatively small in spite of the large amount of information that is gathered. According to one application of the invention, a result of the calculation of the total load is stored in a position in a memory unit of the vehicle. The limited memory requirement is particularly advantageous in applications in a transport means such as a vehicle.

Another example of applications of the invention is in the case of cardan shafts whose strength decreases as the angle in their universal joint increases.

The invention is not limited to the above described exemplary embodiments; a number of further variations and modifications are possible, while remaining within the scope of the patented claims.

When calculating the total load, the first parameter is related to the ratio between a measured second parameter and a reference value for the second parameter. The reference value for the second parameter is based on actual tests of the object. In other words, a normation is made of the operational conditions such as the temperature against values for these, which have been obtained in actual testing.

According to a further embodiment, a plurality of first parameters are measured at each measurement, and the total load is described as a function in which the life influence of each of the first parameters is summed. It is, for example, advantageous in the case of several torques or several forces.

Damage to the object which results in the total load is defined by the total load relative to the initial damage tolerance of the object. In other words, there is a knowledge about the life of the object or its tolerance for loads at specific operational conditions. This knowledge can, for example, be obtained through fatigue testing.

A number of ways of utilizing the result of the calculation of the total load/influence of the life are possible. Below, a number of examples of preferred methods are described.

A user of the object can be billed for damage caused to the object. This can for example be used in the case of renting vehicles. Another area of application for the billing is at sale. At the sale, the seller can sell a system that includes maintenance, exchange privileges, and the like. In other words, it is possible to bill for a degree of usage, such as calculated damage caused to the object. The billing can of course also take place based on further parameters.

According to another example, the remaining life is predicted based on the calculated damage, and based on this prediction, a decision is taken regarding the future operation of the object. The term "future operation" refers to, for example, measures such as maintenance, exchange, restoration and the like. Within the term "future operation," a change of task is also contemplated. Furthermore, the term "future operation" includes a direct change of the operational condition by means of a so-called actuator, as described below.

The task for a machine that includes a number of objects that are susceptible to damage can thus be changed after operation during a certain amount of time so that the built-in damage tolerance for all of these objects, to a high degree, is consumed at the end of the life of the machine. In addition, the task can be changed if a breakdown of the object is predicted to arise within the near future so that the object is exposed to smaller load. The task for a machine which comprises two objects which are susceptible to damage, which objects can be exposed to different degrees of load in different applications, can thus be changed when a breakdown in a first of these objects is predicted in the near future, and in such a way that the first object is relieved of load and the second object is given more load.

Examples of these two objects can be a gear wheel in the powertrain of the vehicle and a beam in the supporting structure (frame) of the vehicle. An example of a vehicle that can be used in applications with such varying loads is an articulated hauler, a so-called dumper. The dumper can be used in a mine, in which application its powertrain is primarily loaded during operation, and can also be used at a construction site with uneven ground, in which application its supporting structure is exposed to load to a higher degree.

By means of the prediction, vehicles in a vehicle fleet can, with increased safety, be used in an optimal way with regard to the life of the comprised components within various areas of use.

According to another example, the remaining life is predicted based on the calculated damage, and the object is valued according to predicted remaining life of the object. Alternatively, the evaluation can be carried out by a machine or a vehicle which contains the object.

According to another example, a signal is transmitted comprising information regarding the operational parameters, damage caused or remaining life from a transmitter which is arranged in connection to the object to a receiver in a base station remotely located from the object for a decision regarding measures for the object. This brings about the possibility to control the status of a plurality of objects or machines that comprise the object. It is particularly useful in the case where the object is arranged in a vehicle, so that the status of an entire vehicle fleet can be controlled from the base station. From the base station, signals can be transmitted to maintenance personnel, retailers, warehouses, repair shops, production units and the like for measures based on calculated remaining life of the vehicle.

According to another example, the result of the calculation is used for design purposes. The calculated damage can be used for validation of a simulation module of the object in operation. Alternatively, the damage is used as a basis for dimensioning future objects which are intended to be exposed to similar operation.

In addition, the invention refers to a computer program product comprising data program segments for carrying out the steps according to the method described above when the program is executed in a computer. The term data program segment in other words refers to software parts. According to a further development of the invention, the data program segments are stored on a computer readable medium. The term computer readable medium refers to for example a disk, a CD-ROM disk or a hard drive.

In addition the invention refers to a system 1 (See FIGS. 5 and 6) for communication between a base station 2 and at least one remotely located stationary or mobily fixed machine 3, via transmitting and receiving means exemplarily illustrated as antennae 5 for control of the operational status of the machine. As illustrated, the machine 3 is arranged in a vehicle 12. The machine 3 is in more detail the driving means of the vehicle 12. The transmitting and receiving means are arranged for the transfer of information utilizing radio waves via antennae 5.

The machine 3 comprises an object (component or aspect) 6 that is susceptible to damage. The object 6 is exemplified in FIG. 6 as a cog wheel in the transmission of the vehicle. The system 1 comprises means 7 for measuring a number of operational parameters of the object 6. A control unit (CPU) 14 is operatively coupled to the measuring means 7, and an A/D converter 15 is operatively coupled between the measuring means 7 and the control unit 14. The system additionally comprises means 8 operatively coupled to the control unit 14 for calculating damage caused to the object 6 based on the measured operational parameters. Memory storage means 9 (memory) is utilized for storing results from the damage calculation. The control unit 14 is arranged to receive a signal from the A/D converter 15, to communicate with the calculation means 8 and memory storage means 9, and to deliver a signal to the transmitting means 4 for transmission by an antenna 5 (See FIG. 6) of a receiving antenna 5 of the base station 2 (See FIG. 5).

The measuring means 7 comprises a plurality of sensors for measuring the above-mentioned operational conditions and operational states.

The calculation means 8 of the system consists of a so-called predictor that is arranged to predict malfunctions or breakdowns of the object 6. The calculation means 8 carry out damage calculations according to the calculation process that has been described above. The evaluation of measured values, including the predictions that are thus carried out directly in the vehicle, and results of this evaluation are transmitted to the base station 2. Alternatively, the calculation means 8 can be arranged in the base station. In this case, the measured values are stored directly in the memory means 9 for later transmission or forwarding to the base station 2 for further processing. According to a further alternative, both the calculation means 8 and the memory means 9 can be arranged in the base station.

The system further comprises an actuator 11 which is operatively coupled to the control unit 14 and the object 6. The actuator 11 is arranged to influence the operational condition and/or operational state based on values measured by the measuring means 7. The actuator is, in this case, a cooling device for cooling the cooling oil which is supplied to the cog wheel 6. Alternatively, the actuator can consist of a filtering unit for filtering out undesired particles in the oil. According to a further alternative, the actuator is a dehydrator for removing water from the oil.

The system 1 further comprises a unit 10 arranged for taking steps that govern the future operation of the machine/object based on the calculation(s). This unit 10, for example, may take the form of a station for spare parts, restoration or maintenance. In this context, the term "taking steps," for example, refers to getting ready to remedy a predicted malfunction or an exchange of the object. According to one alternative, the unit for taking preventative steps exemplarily consists of a facility for producing new objects. The unit 10 can exemplarily comprise transmitting and receiving means in the form of an antenna 5 for communication with the base station 2.

According to the preferred example, the machine is arranged in a vehicle 12 but can alternatively be arranged in a vessel or in a rail-based transport means. It is particularly advantageous to have the ability to monitor/control the status of the mobile means 12.

In the following, the system is exemplarily described with respect to an embodiment in which the object is arranged in a vehicle in the form of a construction machine such as an articulated hauler 12. This should be seen as a preferred, but in no way limiting, application of the invention. The base station 2 can consist of a central unit in a facility configured as a construction site. Facilities management can, from the central unit via wireless communication, control the operational status of all the construction machines 12 within the construction site. By carrying out the measurements and calculations at relatively short time intervals, the operational status of the vehicle fleet of the construction site can be controlled essentially continuously. After such a control, decisions can be taken regarding maintenance, repairs and the like. According to an alternative example, the base station is arranged to control vehicles positioned over a larger geographical area, such as a country or the entire world.

The transmitting and receiving means are arranged to transfer information relating to the status of the machine via a transmission signal in the form of radio waves or via satellite communication. Thus, wireless communication is preferably used, at least in part. The transmitting and receiving means can alternatively be arranged for optical connections, or connection via hardware (in stationary objects) such as via land line, cable or wire.

Figure 5:
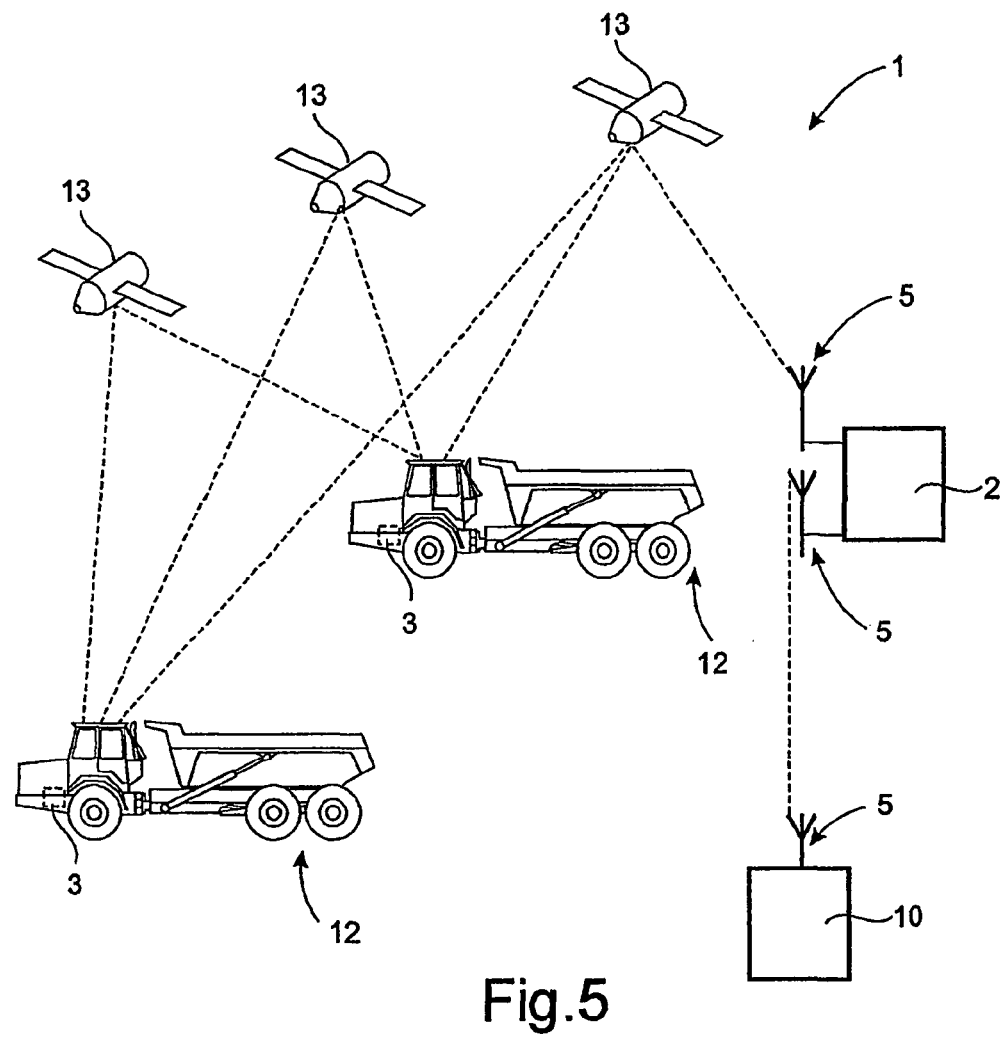
FIG. 5 is a diagrammatic view a system configured according to the present invention.
Figure 6:
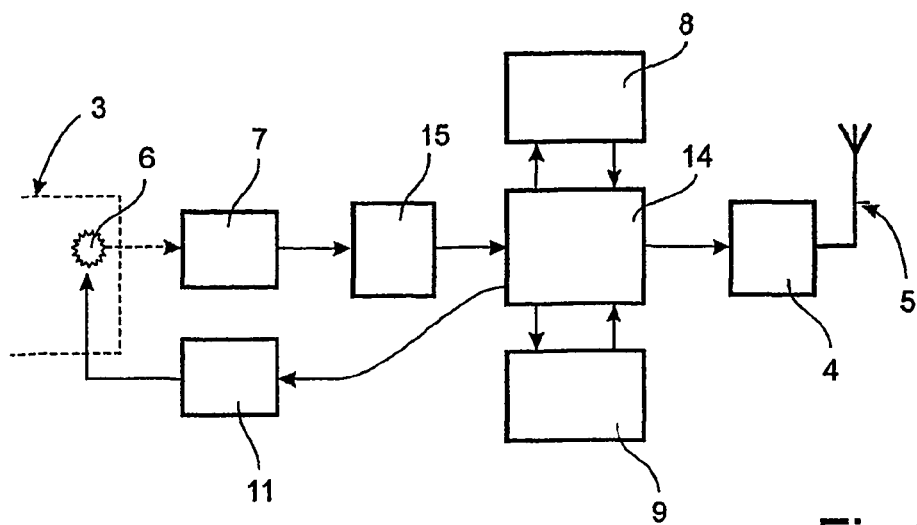
FIG. 6 is a block diagram illustrating an exemplary unit of the system that may reside on a carrying vehicle.

The transmission of information takes place either periodically or upon a request from the base station. A satellite positioning system, preferably a GPS system, can be used for detecting the positions of the vehicles. In FIG. 5, this configuration is illustrated as satellites 13.

In worldwide systems, the system suitably comprises a plurality of units 10 for taking maintenance or other control steps located at various positions in the world with the purpose of supplying a number of vehicles within a specific area with service.

According to an alternative use of the above-mentioned actuator, the control unit is arranged to directly activate it when the measured operational condition exceeds or falls below a prescribed maximum or minimum value for the operational condition. In other words, the damage calculation is not used in this example.

The machine can comprise a plurality of different devices arranged stationarily, and/or mobily, and can exemplarily take the form of combustion engines.

A second embodiment of the method according to the invention relates to the influence of tension loading on an object. Tension loading can be purposefully imposed or at least be permitted to be imposed on supporting structures such as the frame in a vehicle. The invention can of course also be used in a supporting structure of a stationary device.

It is well known that the tension amplitude Sa, also known as the tension width may be represented as $\Delta S$ ($\Delta S = 2*Sa$), which is also a parameter that prompts the crack growth of an object under load; i.e., controls the fatigue process, and that the mean tension, Sm, affects the influence of the tension amplitude. A high average tension accelerates the fatigue process. However, a constant average tension cannot on its own prompt crack growth. This second embodiment is thus analogous with the first embodiment. It is well known to measure tension on an object under load by means of elongation measurements, for example by means of strain gauges. By means of a strain gauge, only one parameter (strain) is obtained. According to the embodiment of the invention described below, a measurement signal from the strain gauge is divided into a first parameter (strain amplitude) and a second parameter (average strain). The first parameter causes, as mentioned above, damage to the object. The second parameter in itself does not cause any damage, but instead affects the damage influence of the first parameter.

The expression that the first parameter and the second parameter are determined by at least one operation, that is a measurement, should be interpreted to not only comprise a direct determination by means of measurement, but to also comprise a measurement followed by another operation or processing of the measured parameter to calculate them.

An assumption that is independent of material of construction is used to describe the influence of the average strain at fatigue since one, in general, does not have knowledge regarding the material used. An equation proposed by Smith, Watson, Topper (SWT) satisfies this requirement. SWT is a special case ($\Delta S(R=-1)$, $g=0.5$) of the more general Walker's equation in which $\Delta S(R=0) = \Delta So = S_{max}^{(1-g)l} {}^{*\Delta Sg}$ {Equation 13}. In this equation, g is a constant <1 and $R = S_{min}/S_{max}$, $S_{max} = Sm + Sa$, $S_{min} = Sm - Sa$, $\Delta S = S_{max} - S_{min} = 2*Sa$, $\Delta So$ for $R=0$, $\Delta S1$ for $R=-1$. A rearrangement of this equation gives $\Delta S1/\Delta S = Sa1/Sa = (1 + Sm/Sa)^{(1-g)} = (2/(1-R))^{(1-g)}$ {Equation 14}.

In an evaluation with the Rainflow method of a measured input signal of the strain the strain width and the average strain are obtained. A damage value at varying load (R=−1); therefore, $D1=\Sigma(\Delta S1i^m * ni)$ {Equation 15}. A combination of {Equations 14 and 15} render $D1=\Sigma((\Delta Si^m * ni)*(1+Smi/Sai)^{m*(1-g)})$ {Equation 16}, which is thus a measurement of the total load.

The Rainflow method is thus combined with a special case (the SWT equation) of Walker's equation in order to arrive at an expression for the total load. The invention, however, is not limited to Walker's equation, but a suitable function which adjusts for the influence of the average tension on the effect of the tension amplitude can be used.

The calculation is carried out successively, and the adjusted damage value (the total load) is successively added to the same cell in a memory unit. Thus, a method is obtained to adjust "on-line" for the influence of the average strain. It is in an analogous manner possible to instead adjust to another R value (for example R=0 instead of as here, R=−1).

The phenomena of the influence of the average strain, or alternatively, of the R value, can also be formulated in terms of fracture mechanics. The process is thus not limited to Walker's function; and thereby constitutes a third embodiment of the invention. The maximum level at which a crack does not grow is defined as a threshold value. The threshold value is very much dependent on the R value for most materials. This may be represented by: $\Delta K_{th}=\Delta K_{tho}*(1-R)^g$ {Klesnil and Lukas} or $\Delta K_{th}=a+b*(1-R)$ wherein $\Delta K_{th}$ is the threshold value of the strain intensity index where R=0 and a and b are constants.

Another phenomena which is characterized as "Crack Closure" can be described as $\Delta Keff/\Delta K=U=c+d*R$ (Elber).

In both cases, an adjustment of the life is obtained depending on the R value, which can easily be described as amplitude and average strain.

Furthermore, the evaluation of the signal is not limited to Rainflow. A combination of "Range Pair" and "Level Crossing," or the latter alone, can yield approximating information about the R value.

According to a further development of the second embodiment, the non-adjusted damage is added in another cell. The ratio between the adjusted and non-adjusted damage will give the influence of the average strain on the damage in the time plane.

It is possible to carry out the corresponding evaluation of a stored Rainflow matrix. This, however, needs more memory space. In addition, this does not give as good of precision since the amount of intervals is limited.

It is important that the parameter g can be chosen. In welding construction, it is assumed that residual strains are so great that the average strain can be neglected. In the case of spectrum load, which is in general the case, the high loads will, however, successively trigger the residual strains, which will lead to the average strain affecting the fatigue damage. By arriving at suitable values of the constant g, it is possible to describe this phenomena in an adequate manner.

In the following, two illustrative examples are provided of applications of the second embodiment of the present invention. In the first example, a flying airplane is utilized, and in which the tension load on a wing will vary. That is, the tension amplitude around an average tension present on the lower side of the wing is positive tensile stress. These varying average strains will increase and decrease, respectively, the damage effect of the strain amplitude. Contrarily, the average strain separately will give rise to none, or very small damage influence.

In a second illustration, a load vehicle is utilized, and in which the average strain in supporting parts, for example frame members, depends on whether the vehicle is loaded. This influences the damage effect of the variation in strain that is described with its amplitude or width. A constant average strain does not give rise to any damage influence in the case of fatigue. However, the shifts between, for example, two average strain levels will in time contribute to damage. But the shifts will, in the evaluation, be treated as amplitudes.

It should be appreciated, however, that the second embodiment of the presently disclosed inventive method is not limited to estimating damage or wear to an object caused by strain load. The measurement signal which is evaluated can be any signal, force, torque, pressure and/or the like which can be related to strain.

The invention claimed is:

1. A method for estimating a remaining operational life of a functional article after life-reducing utilization of the article has occurred which is at least partially attributable to loaded operation of the article, said method comprising:

monitoring a functional article utilizing an operation in which at least two parameters associated with the article are assessed, said two parameters comprising a first parameter that causes operational life shortening degradation to the article and a second parameter that influences the rate of operational life shortening degradation caused by said first parameter, but alone does not cause operational life shortening degradation to the article;

measuring, repeatedly, at least one of said parameters during operation of the functional article capable of assessing a total load in the article, wherein the total load represents a combined operational life shortening degradation of the article because of an interaction between the first and second parameters' combined influence on the article; and estimating the remaining operational life of the article based at least in part on a calculation including a product of values of the two parameters, the calculation representing an adjusted total load attributable to the article.

2. The method as recited in claim 1, wherein the adjusted total load is calculated a plurality of times during a time period during which the measuring of the at least one parameter is conducted.

3. The method as recited in claim 1, wherein the adjusted total load is calculated after each measurement of the at least one parameter.

4. The method as recited in claim 1, wherein calculated adjusted total load values are summed, and the result is stored in a first field of a memory unit.

5. The method as recited in claim 4, wherein summation of the adjusted total load values is carried out after each measurement of the at least one of said parameters.

6. The method as recited in claim 4, wherein, for subsequent calculations of the adjusted total load, the second parameter is assumed to be constant for a plurality of measurements of the first parameter, the adjusted total load is calculated with the second parameter at the constant value, and the calculated values for the adjusted total load are summed and the result is stored in a second field in the memory unit.

7. The method as recited in claim 1, wherein a number of load cycles of the first parameter is measured and a matrix in a memory unit is populated therefrom, said matrix comprising a plurality of different positions which each corresponds to a specific operational state and a specific operational condition, and the number of load cycles are cumulatively collected.

8. The method as recited in claim 1, wherein at least one of the first and the second parameters are described as an exponential function.

9. The method as recited in claim 1, wherein during the calculation of the adjusted total load, the first parameter is related to a condition between a measured second parameter and a reference value for the second parameter.

10. The method as recited in claim 9, wherein the reference value is based on actual tests of the article.

11. The method as recited in claim 1, wherein a plurality of first parameters are measured in parallel, and the adjusted total load is calculated utilizing a function in which the life influence of each and everyone of the first parameters at the conditions are summed.

12. The method as recited in claim 1, remaining operation life of the article is calculated based on total load which is defined by total load relative to an initial damage tolerance of the article.

13. The method as recited in claim 1, wherein after a certain period of time, a total life influencing damage of the article is calculated as the sum of each of the previously calculated the adjusted total loads.

14. The method as recited in claim 13, wherein a value of the remaining life of the article is calculated based on total life influencing damage.

15. The method as recited in claim 1, wherein the adjusted total load on the article is calculated based on linear partial damage theory.

16. The method as recited in claim 1, wherein the adjusted total load on the article is calculated based on the Palmgren-Miner's partial damage theory.

17. The method as recited in claim 1, wherein the first parameter is measured with a higher frequency than the second parameter.

18. The method as recited in claim 1, wherein the article is a rotating object.

19. The method as recited in claim 1, wherein the article is arranged in a vehicle.

20. The method as recited in claim 19, wherein the article is a component in a gear box of the vehicle.

21. The method as recited in claim 19, wherein the article is a portion of a cardan shaft that defines an angular shift in the longitudinal direction of the shaft.

22. The method as recited in claim 19, wherein a result of the calculation of the adjusted total load is stored in a position in a memory unit of the vehicle.

23. The method as recited in claim 1, wherein the first and the second parameters are calculated from only one measured value and utilizing a mathematical algorithm.

24. The method as recited in claim 23, wherein the mathematical algorithm is representative of the Rainflow method.

25. The method as recited in claim 23, wherein the adjusted total load is calculated by means of a function which adjusts for the influence of the average tension on the effect of the amplitude of the tension.

26. The method as recited in claim 23, wherein the article is a part of a supporting structure of a vehicle.

27. The method as recited in claim 1, further comprising:
controlling subsequent use of the article based on the estimated remaining operational life of the article.

28. The method as recited in claim 1, further comprising:
valuing the article based on the estimated remaining operational life of the article.

29. The method as recited in claim 1, further comprising:
utilizing the estimated remaining operational life of the article as the basis for dimensioning future articles which are intended to be exposed to similar operation.

30. The method as recited in claim 1, further comprising:
utilizing the estimated remaining operational life of the article for validating a simulation model of the article in operation.

31. The method as recited in claim 1, further comprising:
utilizing a difference in the estimated remaining operational life of the article between delivery and return of the article to a user for calculating charges to user for utilization of the article.

32. The method as recited in claim 31, wherein a signal comprising information about the parameters and estimated remaining operational life of the article is transmitted from a transmitter associated with the article to a receiver associated with a base station located remotely from the article, said signaled information being utilized for decision making regarding measures to be taken with respect to the article.

33. The method as recited in claim 31, wherein the article is arranged in a vehicle.

34. The method as recited in claim 1, information regarding remaining operational life of the article is presented to a driver of the vehicle.

35. A system for estimating a remaining operational life of a functional article after life-reducing utilization of the article has occurred which is at least partially attributable to loaded operation of the article, said system comprising:

means for monitoring a functional article utilizing an operation in which at least two parameters associated with the article are assessed, said two parameters comprising a first parameter that causes operational life shortening degradation to the article and a second parameter that influences the rate of operational life shortening degradation caused by said first parameter, but alone does not cause operational life shortening degradation to the article;

means for repeatedly measuring at least one of said parameters during operation of the functional article capable of assessing a total load in the article, wherein the total load represents a combined operational life shortening degradation of the article because of an interaction between the first and second parameters' combined influence on the article; and means for estimating the remaining operational life of the article based at least in part on a calculation including a product of values of the two parameters, the calculation representing an adjusted total load attributable to the article.

* * * * *